United States Patent [19]
Seazholtz et al.

[11] Patent Number: 5,737,706
[45] Date of Patent: Apr. 7, 1998

[54] POWER SYSTEM SUPPORTING CDPD OPERATION

[75] Inventors: John W. Seazholtz, Great Falls; Robert D. Farris, Sterling, both of Va.

[73] Assignee: Bell Atlantic Network Services, Inc., Arlington, Va.

[21] Appl. No.: 510,732

[22] Filed: Aug. 3, 1995

[51] Int. Cl.⁶ .................................................. H04Q 11/04
[52] U.S. Cl. .......................... 455/466; 455/343; 455/127
[58] Field of Search .............................. 455/38.3, 343, 455/27, 33.1; 379/59, 58

[56] References Cited

U.S. PATENT DOCUMENTS

| | | | |
|---|---|---|---|
| 3,564,150 | 2/1971 | Muller . | |
| 3,575,558 | 4/1971 | Leyburn . | |
| 3,627,955 | 12/1971 | Stone, Jr. . | |
| 3,655,991 | 4/1972 | Schneider . | |
| 3,824,404 | 7/1974 | Ghere . | |
| 3,906,166 | 9/1975 | Cooper et al. . | |
| 3,976,840 | 8/1976 | Cleveland et al. . | |
| 3,976,995 | 8/1976 | Sebestyen . | |
| 4,005,388 | 1/1977 | Morley et al. . | |
| 4,074,145 | 2/1978 | Laffoon et al. . | |
| 4,095,215 | 6/1978 | Mortimer . | |
| 4,128,740 | 12/1978 | Graziano . | |
| 4,268,721 | 5/1981 | Nielson et al. . | |
| 4,279,021 | 7/1981 | See et al. . | |
| 4,301,531 | 11/1981 | Lubin . | |
| 4,352,955 | 10/1982 | Kai et al. . | |
| 4,613,990 | 9/1986 | Halpern . | |
| 4,654,867 | 3/1987 | Labedz et al. . | |
| 4,661,972 | 4/1987 | Kai . | |
| 4,679,244 | 7/1987 | Kawasaki et al. | 455/54.1 |
| 4,730,187 | 3/1988 | Menich et al. . | |
| 4,802,200 | 1/1989 | Murata et al. . | |
| 4,812,843 | 3/1989 | Champion, III et al. . | |
| 4,825,456 | 4/1989 | Rosenberg . | |
| 4,850,006 | 7/1989 | Sasaki et al. . | |
| 4,941,200 | 7/1990 | Leslie et al. | 455/33.1 |
| 4,947,420 | 8/1990 | Stahl et al. . | |
| 4,962,523 | 10/1990 | Tanaka . | |
| 5,001,742 | 3/1991 | Wang . | |
| 5,008,925 | 4/1991 | Pireh . | |
| 5,020,091 | 5/1991 | Krolopp et al. . | |
| 5,023,902 | 6/1991 | Anderson et al. . | |
| 5,054,052 | 10/1991 | Nonami | 379/58 |
| 5,109,530 | 4/1992 | Stengel | 455/38.3 |
| 5,115,514 | 5/1992 | Leslie | 455/9 |
| 5,117,449 | 5/1992 | Metroka et al. . | |
| 5,119,397 | 6/1992 | Dahlin et al. . | |
| 5,128,980 | 7/1992 | Choi . | |
| 5,140,698 | 8/1992 | Toko . | |
| 5,148,473 | 9/1992 | Freeland et al. . | |
| 5,153,903 | 10/1992 | Eastmond et al. . | |
| 5,166,973 | 11/1992 | Hoff . | |
| 5,168,574 | 12/1992 | Gordon et al. . | |
| 5,175,439 | 12/1992 | Harer et al. . | |
| 5,175,758 | 12/1992 | Levanto et al. . | |
| 5,195,090 | 3/1993 | Bollinger et al. . | |
| 5,196,728 | 3/1993 | Jaux . | |
| 5,199,031 | 3/1993 | Dahlin | 455/33.1 |
| 5,202,912 | 4/1993 | Breeden et al. . | |
| 5,203,020 | 4/1993 | Sato et al. | 379/58 |
| 5,212,722 | 5/1993 | Murata . | |
| 5,228,074 | 7/1993 | Mizikovsky . | |
| 5,241,537 | 8/1993 | Gulliford et al. . | |
| 5,241,568 | 8/1993 | Fernandez et al. . | |
| 5,247,566 | 9/1993 | Hiramatsu . | |
| 5,247,700 | 9/1993 | Wohl et al. . | |
| 5,249,218 | 9/1993 | Sainton . | |
| 5,253,287 | 10/1993 | Hasegawa . | |
| 5,255,179 | 10/1993 | Zekan et al. . | |
| 5,257,401 | 10/1993 | Dahlin et al. . | |
| 5,265,270 | 11/1993 | Stengel et al. . | |
| 5,274,699 | 12/1993 | Ranz . | |
| 5,354,597 | 10/1994 | Capik et al. . | |
| 5,365,512 | 11/1994 | Combs et al. . | |
| 5,365,524 | 11/1994 | Hiller et al. . | |
| 5,382,949 | 1/1995 | Mock et al. . | |
| 5,396,539 | 3/1995 | Slekys et al. . | |
| 5,519,506 | 5/1996 | D'Avello et al. | 379/58 |
| 5,526,398 | 6/1996 | Okada et al. | 379/59 |
| 5,533,019 | 7/1996 | Jayapalan | 455/33.1 |
| 5,533,029 | 7/1996 | Gardner | 455/33.1 |
| 5,594,740 | 1/1997 | LaDue | 379/59 |
| 5,628,054 | 5/1997 | Osaka | 455/89 |

FOREIGN PATENT DOCUMENTS

| | | |
|---|---|---|
| 0439926A2 | 12/1990 | European Pat. Off. . |
| 0437297A2 | 8/1991 | European Pat. Off. . |
| 0514360A2 | 4/1992 | European Pat. Off. . |

| | | |
|---|---|---|
| 0521609A3 | 5/1992 | European Pat. Off. . |
| 0 521 610 A2 | 1/1993 | European Pat. Off. . |
| 2239567 | 4/1990 | United Kingdom . |
| 2241854 | 2/1991 | United Kingdom . |
| 2260064 | 9/1992 | United Kingdom . |
| WO91/07044 | 10/1990 | WIPO . |

OTHER PUBLICATIONS

Limited Size Messaging (LSM) Protocol, HP OpenMail.

"Cellular Nets to Ride Analog Voice Lines", by Booker, Computerworld, Jul. 26, 1993.

"E–Mail Unplugged by Wireless WANs", BYTE, Nov. 1993.

"Moving Toward a Wireless Infrastructure", by Wexler, Computerworld, Oct. 11, 1993.

"Connecting the Wireless World", by Wirbel, Electronic Engineering Times, Mar. 1, 1993.

*Primary Examiner*—Dwayne Bost
*Assistant Examiner*—Myron K. Wyche

*Attorney, Agent, or Firm*—Lowe, Price, LeBlanc & Becker

[57] ABSTRACT

A portable radio telephone handset includes the capability of operating as a data transfer terminal as well as an analog cellular telephone subscriber station. Two modes of operation are available in the handset, and a analog cellular communication mode and a Cellular Digital Packet Data (CDPD) mode. A controlled processor in the handset is used to program the power supply to follow a prioritized, high efficiency operating cycle, preferably tracking CDPD active/sleep mode duty cycle. The power supply has the capability of providing 120 volts AC output for other communication systems. The availability of 120 volts output is programmed to track the functions of the CDPD operation and Advanced Mobile Phone Service (AMPS) operation.

13 Claims, 5 Drawing Sheets

POWER SYSTEM SUPPORTING CDPD OPERATION

TECHNICAL FIELD

This invention relates generally to power provision for wireless communication devices. More particularly, the invention relates to a power system having a duty cycle configured to particular wireless portable telephones operating in both data and voice modes.

BACKGROUND ART

Mobile wireless communication of analog voice signals was initially carried by half duplex radio systems. Citizens Band radio, one type of mobile wireless radio, uses amplitude modulation (AM) upon a carrier frequency to transmit or receive voice signals in this half duplex mode. Other mobile wireless radios used frequency modulation (FM) within a given carrier frequency range in order to transmit or receive voice signals, half duplex, achieving improved noise characteristics. These mobile wireless radios allowed a user to move within a given radius of antennas. A disadvantage of these systems was that once a user was beyond the range of a given base antenna, the radio channel for a given carrier frequency became inoperative. Another disadvantage was that wireless half duplex voice communication was unacceptable to most consumers. The consumer wanted a wireless duplex voice communication system similar to his or her wired home telephone.

In the 1980's, mobile wireless duplex voice communication was introduced into the marketplace by using an analog FM based cellular radio. This analog cellular system for mobile wireless duplex voice transmission was called "Advanced Mobile Phone Service" (AMPS). Introduced by AT&T, the AMPS cellular network uses the FCC assigned carrier frequency range of 800 to 900 MHz. AMPS automobile cellular units were first permanently attached to the user's car. Automobile cellular units transmitted voice signals to a cellular base station within a given cell using one watt of power. Hand-held cellular units using battery power supplies were later introduced and transmitted voice signals to a cellular base station within a given cell using one quarter watt of transmit power. Because hand held cellular units operate using a battery power supply, the power consumed by the cellular phones became critical.

When a cellular phone is powered on and waiting to receive a phone call, it is in a stand-by mode consuming less power than in an active mode. However, when a hand held unit is in a stand-by mode, it constantly listens for its registration number in order to become active and receive a phone call. The stand-by mode, although lower in power than the active communication mode, continuously uses a considerable amount of power. Thus, it is desirable to further decrease the amount of power used in the stand-by mode in order to further increase the time the cellular unit requires for recharging or replacing batteries.

The human voice in analog form was the initial signal that the AMPS system was designed to use in communication. The AMPS system was optimized for carrying as many analog voice signals within a given bandwidth of a channel as possible. Mobility of the cellular telephone using low power mobile units, FM modulation, and the higher carrier frequency range (800 MHz-900 MHz) has been achieved through a cellular arrangement of antennas whereby a user's signal is handed off to the next cell site as he moves into a different cell area. This cellular handoff can cause a temporary loss in transmission or reception. However, temporarily losing a voice signal is not critical because a user knows when there is a signal loss and can retransmit the voice information. However, signal loss, even though temporary, poses special problems for transmission of digital data. Some other problems causing loss of voice signal are fading signal strength, reflections, Rayleigh fading, and cellular dead spots.

The availability of portable computers naturally has led to the desire to transmit digital data via wireless from a remote location. Presently, the AMPS voice mode is being used to transmit digital data in the form of Circuit Switched Cellular Data across AMPS carrier channels. Raw (baseband) digital data is converted so that it can be transmitted and received across the analog AMPS system.

One disadvantage to using AMPS in this manner is that a narrow channel bandwidth and errors in transmission limits the baud rate of transmitting and receiving digital data. Another disadvantage of using AMPS to communicate digital data is that movement of the subscriber unit may cause a cellular handoff to occur, thus causing a loss of the digitally transmitted or received information. Loss of digital data may corrupt a data file such that it is useless. Other losses of the raw digital data may be caused by other problems of the AMPS mobile cellular system.

Another wireless communication device is a pager. Most pagers use simplex or one way communication receiving only a limited amount of information such as a telephone number. Also, most pagers only display information to a user on demand and perform no other function. Because only one way communication is required, an acknowledgement is not returned by the pager to the original sender. In many cases it is desirable that a sending party receive a minimal acknowledgement telling him that his page message was received. In some cases it may be appropriate to respond by leaving a return page message. A disadvantage of present paging systems is that acknowledgment and return pages are not widely available because simplex paging is more commercialized than other paging modes. Another disadvantage of present pagers is that a displayed telephone number is not automatically and electronically dialed directly on a telephone. A user reads the telephone number from a pager's display and manually dials the number on a telephone in order to contact the paging party. It is desirable that a wireless pager have the capability of automatically dialing a received telephone number on a wireless cellular telephone via electronic means, thus integrating the features of a wireless cellular telephone with that of a duplex pager.

Another hard-wired system that is presently popular is high speed fax-modems. Fax-modem hardware and firmware in conjunction with fax and data communication application software have the capability of sending digital data over various modem protocols as well as sending facsimile data by using the various facsimile protocols. Fax or data communication application software may operate on different hardware such as home or portable computer, personal communicator, personal digital assistant, or other electronic devices. Examples of modem protocols for standard modulated data are CCITT V.22bis, CCITT V.23, CCITT V.32, Bell103, and Bell212A. Modem protocols that include error control include CCITT V.42, MNP2, MNP3, MNP4, and MNP10. Modem protocols that provide data compression are CCITT V.42bis and MNP5. Facsimile protocols include CCITT V.21, CCITT V.27ter, CCITT V.29, CCITT T.4, CCITT T.30, CCITT T.35, Class I-EIA/TIA 578, Class I-EIA 592, and Class II-EIA 578-SP2118. A fax-modem accepts raw (baseband) digital data from an electronic device over an internal data bus or external RS-232 port. This raw digital data is converted and modulated into data of a given protocol for transmission onto a standard telephone line. Data received from the telephone line can be converted from the modulated form into raw digital data that can be interpreted by the hardware, firmware and application software.

A disadvantage of present fax-modems is that most require a hard-wired connection, usually via a telephone line. Present methods of providing wireless capability for a fax-modem take the modulated analog modem output signal from a fax-modem and input this into an AMPS conversion unit. The AMPS conversion unit converts and modulates the transmitted analog modem output signal into a different analog form for transmission onto the AMPS network. The analog modem output signal is converted into what is called Circuit Switched Cellular Data. Received AMPS signals can be converted from Circuit Switched Cellular Data by the AMPS conversion unit into analog modem input signals that the fax-modem can receive. Presently, fax-modems do not directly convert and modulate raw digital data into an analog signal for transmission onto the AMPS cellular network.

A disadvantage with present methods of providing wireless fax-modem capability is the requirement of additional devices to send or receive fax and digital data over the AMPS cellular network. Another disadvantage is that more power is necessary for additional components, such as the AMPS conversion unit. A further disadvantage is that a user must carry a portable computer, fax-modem, and AMPS conversion unit to provide wireless fax-modem capability. It is desirable to incorporate a fax-modem and AMPS conversion unit into one unit providing the capability of sending Circuit Switched Cellular Data across the AMPS network.

A disadvantage to using Circuit Switched Cellular Data communication across AMPS is that it requires that the mobile unit be stationary to avoid losing data from fading or cellular handoff associated with a non-stationary mobile AMPS communication. Thus, a mobile unit should avoid being moved even slightly when performing communication of Circuit Switched Cellular Data using the AMPS network.

Heretofore, providing efficient wireless transmission of both voice and data signals into one small hand held integrated package has been difficult. Furthermore, it is difficult to integrate the features of AMPS voice transmission with applications such as data transmission, electronic mail, duplex paging and provide a Circuit Switched Cellular Data interface such as a wireless fax-modem into a single hand held battery operated wireless unit. Also, the integration of these features into a single hand held unit has not been possible because of the unavailability of the underlying electronic components and application software required to integrate all these features into a single hand held unit.

Another difficulty of any voice/data arrangement is the efficient switching of operation between the two modes of communication. Normally one mode (usually the AMPS voice mode) is given priority over the data mode. Consequently, avoiding loss of data mode transmissions when AMPS communications occur has always been problematical. Further, the use of band space by data mode communication in the absence of AMPS voice communications has heretofore been inefficient. Data communication directed to a particular mobile station is often lost if the mobile station does not scan for such data within a predetermined period of time. Thus, if data transmission communications are being held within the network for a mobile station that is temporarily off the data network, such communication is easily lost (usually by being discarded by the network) if the mobile station does not re-establish contact with the data network within a time period determined by the network. Since this time parameter is determined for all of the mobile stations within a given network, there is no flexibility based upon the type of operations carried out by individual mobile stations. This lack of flexibility renders reliable data communication problematical at best.

One solution to the aforementioned difficulties of integrating portable voice and data communications resides in a digital wireless communication technology developed to overcome some of the undesirable effects of transmitting raw digital data over the AMPS system. This digital wireless communication system and network is called Cellular Digital Packet Data (CDPD). The CDPD communication system shares the same carrier frequencies assigned to the AMPS channels as indicated in Appendix I, and adheres to the standards specified in Appendix II. A base unit known as a mobile data base station (MDBS), of the CDPD system utilizes an unused channel within an AMPS cell to establish a link and communicate to a user's mobile end system. The mobile end system (M-ES) is a portable computer or other portable electronic device containing a subscriber unit.

The Mobile Data Base Station (MDBS) then forwards the communication from the mobile end user across a service provider's network of wire lines, microwave links, satellite links, AMPS cellular links, or other CDPD links in order to transmit data to another mobile end system, computer network, or other non-mobile electronic system. Within a cell area the MDBS first performs "RF sniffing" in order to detect an unused AMPS channel. CDPD use of an AMPS channel is limited to the idle time between AMPS channel access. If an AMPS cellular unit begins transmitting on a channel occupied by CDPD, the CDPD unit ceases transmitting on that channel and waits until the same channel becomes available or switches, referred to as channel hopping, to a different available channel.

The CDPD network is designed to operate as an extension of existing data communications networks. A CDPD network shares the transmission facilities of existing analog cellular telephone networks, such as an AMPS network. The CDPD MDBS equipment is located at a cellular carrier's cell site and is integrated with existing AMPS base station cellular equipment. CDPD provides a non-intrusive packet-switched data service that shares frequency channels with AMPS networks without impacting on AMPS service. This is done using control at the end-user terminal (analogous to the mobile subscribers in a cellular system).

The packetized nature of the data transmission from the mobile subscribers allows many CDPD users to share a common channel, accessing the channel only when they have data to send and otherwise leaving it available to other CDPD users. For mobile users whose data transmission requirements are characterized by numerous transmissions of short to medium duration, CDPD is a far more effective mode of communication than circuit switched cellular data modems. CDPD has been adopted as a national standard by the cellular industry and adheres to the standards contained in the publications of Appendix II of this application.

In comparison to AMPS to which the CDPD system is appended, the infrastructure requirements of the CDPD system are very small. The multiple access nature of the system makes it possible to provide substantial CDPD coverage to many users simultaneously with the installation of only one CDPD radio in a given sector. Unlike AMPS, which uses in-band FSK signaling to establish call connections and out-of-band (control channel) signals to control the mobility, CDPD uses a sophisticated set of in-band protocols to control channel access and mobility and to manage the transfer of data throughout the CDPD network. These are discussed in greater detail in Appendix I which also illustrates the relationship between a host AMPS and an appended CDPD network.

Although the CDPD system shares existing AMPS radio frequency channels, AMPS calls are given first priority, and they are always able to preempt the use of any channel being used by CDPD. However, this protocol is not absolute and a cellular service provider may decide to dedicate one or more channels to CDPD use. In such a case, AMPS calls will not preempt the channel(s) occupied by CDPD signaling. In order to assign priority to predetermined type of signal, signal discrimination is necessary. In an MDBS employing CDPD, the most common technique includes "RF sniffing" to detect the presence or absence of AMPS activity on any given channel. In some systems, the base station can be given channel information directly by the AMPS equipment via a data interface. If the R. F. sniffer finds that a channel is not in use, the MDBS may establish a CDPD network on a particular channel by transmitting on a forward link. The mobile end user will acquire the forward link, register, and then begin to transmit packets on return channels according to a digital sense multiple access (DSMA) scheme in which the mobile end user accesses the channel only when they have data to send. Thus, the CDPD network keeps track of the channels in use while the AMPS does not.

FIG. 1 depicts a generalized system used to support the CDPD operation previously described. The overall system of FIG. 1 is necessary to an understanding of the present invention since many operational aspects of the mobile end system (user handset) are determined by the operation of the rest of the system via various levels of protocol. Consequently, the interaction of the mobile end system M-ES 2 does not begin and end with the mobile data base station 1.

The MDBS 1 of the CDPD system utilizes a channel within an AMPS cell to establish a link and communicate to a user's mobile end system (M-ES 2). The MDBS may be applicable to other frequencies outside of AMPS that are available to it. The mobile end system is a portable computer, handset or other portable electronic device containing a subscriber communication unit. The MDBS serves as a communication link between the user of the M-ES 2 and a service provider's network of wire lines, microwave links, satellite links, AMPS cellular links, or other CDPD links (such as mobile data intermediate system MD-IS 3, and intermediate system 7) to convey data to another mobile end system, computer network, or non-mobile end-user system (F-ES 10).

The CDPD network is designed to operate as an extension of existing communication networks, such as AMPS networks (MTSO 4 and base stations 5, 5') and the internet 6 network. From the mobile subscriber's perspective, the CDPD network is simply a wireless mobile extension of traditional networks. The CDPD network shares the transmission facilities of existing AMPS networks and provides a non-intrusive, packet-switched data service that does not impact AMPS service. In effect, the CDPD network is entirely transparent to the AMPS network, which is "unaware" of the CDPD function.

The CDPD system employs connectionless network services (CLNS) in which the network routes each data packet individually, based on the destination address carried in the packet and knowledge of current network topology. The packetized nature of the data transmissions from a mobile end system (M-ES) 2 allows many CDPD users to share a common channel, accessing the channel only when they have data to send and otherwise leaving it available to other CDPD users. The multiple access nature of the system makes it possible to provide substantial CDPD coverage to many users simultaneously with the installation of only one CDPD station in a given sector (transmitting range and area of a standard AMPS base station transceiver).

The airlink interface portion (A) of the CDPD network consists of a set of cells (as in a cellular telephone system). A cell is defined by the geographical boundaries within the RF transmission range from a fixed transmission site such as MDBS 1 and 1" transmission from which can be received at acceptable levels of signal strength by mobile subscribers such as M-ES 2. The transmitter supporting the cell may be located centrally within the cell, with transmission carried out via an omni-directional antenna, or the transmitter may be located at the edge of a cell and transmitted via a directional antenna. This second type of cell is also referred to as a sector. In typical configurations, the transmitters for several sectors are co-located. The area served by a set of cells has some area overlap, so that a roaming mobile end system can maintain continuous service by switching from one cell to an adjacent cell in a manner roughly analogous to the standard hand-off in an AMPS system. The two cells are considered to be adjacent if an M-ES can maintain continuous service by switching from one cell to the other. This switching process is called cell transfer, and is done independently of normal AMPS hand-off procedures.

In FIG. 1, the interface (A) between the mobile end system 2 and the MDBS 1 is an "air interface" constituted by a radio frequency link using standard AMPS frequencies. The MDBS 1 is connected to other mobile data base stations through a mobile data intermediate system (MD-IS) 3. A number of mobile data base stations can be under the control of a single mobile data intermediate system (MD-IS 3). The mobile data intermediate systems are connected to each other through intermediate systems and data networks such as 7 and 6, respectively.

The intermediate systems are constituted by at least one node connected to more than one sub-network (such as MD-IS). The intermediate system has the primary role of forwarding data from one sub-network to another. The mobile data intermediate system 3 performs data packet routing based on knowledge of the current location of each mobile end system within the range of the mobile data base stations under the control of the MD-IS 3. The MD-IS is the only network entity that is "aware" of the location of any of the mobile end systems, and is analogous to a Mobile Telephone Switching Office (MTSO 4). A CDPD-specific Mobile Network Location Protocol (MNLP) is operated between each MD-IS (through the intermediate system 5, 6 and 7) to exchange location information regarding the mobile end systems.

The overall CDPD network is controlled by a network management system (NMS) 8 having an interface with at least one mobile data intermediate system 3. Using a special protocol, programming instructions can be transmitted from the NMS 8 through the MD-IS 3 to any number of mobile data base stations under the proper conditions.

Such programming can be used to convey useful network data to the MDBS, as well as configuring the operation of an MDBS with respect to such critical features as maintaining channel queues. The NMS also controls other CDPD system characteristics such as the timing of paging messages to coincide with the non-dormant periods of the M-ES handsets. One advantage of this arrangement is the capability of providing operating instructions to mobile data base stations from the NMS 8 through an MD-IS 3, or by a direct connection to the MDBS as is outlined in the detailed description of the MDBS architecture. The functions and protocol as carried out by each of the mobile end systems and the mobile data base station are explained in greater detail later herein.

To fully utilize the CDPD system, the network management system is necessary. The NMS preferably monitors and directs the CDPD system at a location remote from the mobile data base stations, downloading new programming when appropriate. The network management system has the capability of downloading software into any MDBS in the CDPD system via a network link using a special mobile data base station utility protocol (MUP). This protocol is carried out in addition to that of the physical layer, medium access control (MAC) layer and data link layer. All these are normally used by the MDBS according to the OSI layered communications architecture outlined in Appendix I.

The network management system is concerned with the management of the various open system interconnection (OSI) elements used for establishing, monitoring and controlling communications between the various system entities. The services provided include:
1. Names and addresses of users;
2. Determination of adequate resources and authority to communicate;
3. Quality of service to be provided; and
4. Agreement on the protocols for exchanging data.

Additional information regarding the network management system is found in Appendix I.

The MDBS utility protocol (MUP) is a proprietary protocol which allows configuration, control and debug functions to be performed on the MDBS locally and remotely. This protocol is used extensively in the initial phase of the MDBS software deployment to provide control access to the MDBS while a full feature network management system is not yet available. The MUP is capable of communicating with the MDBS via various transport and sub-network layers. In particular, the MUP will be carried out over a DS0 link using a network port, and over an RS-232 asynchronous link using the utility port. The MUP permits a "gateway" capability by which the MDBS network management software will access the MDBS utility software to provide utility functions. This is an alternate solution to the managing protocol for the MDBS described in Section 7.5 of the CDPD specification.

The MUP is a peer-to-peer protocol operating in an asynchronous balanced mode. Thus, all messages can be initiated at either the MDBS or the NMS since both ends are generally considered as DTE's (data termination equipment) in this particular implementation. This protocol supports full duplex communication as well as message "pipelining" A maximum of three outstanding unacknowledged send messages is permitted in this implementation.

The MUP is a byte-oriented protocol (meaning that the byte alignment between protocol data is guaranteed at the physical layer). It is assumed in this protocol that only an integral number of bytes is contained in the information field. This protocol requires that all frames start and end with a flag character (0×7E). This frame format consists of the aforementioned flag, an 8-bit address, an 8-bit control portion, an information portion having from 0 to 256 bytes, the first 8-bit frame check portion, a second 8-bit frame check portion and a second flag.

The 8-bit address field is divided into two sub-fields: protocol identifier (PID) and address. Bits 0–3 of this field are designated as the protocol identifier field which is used to provide the protocol compatibility check and allow the data link layer to support multiple data protocols. Bits 4–7 of this field is the device address field which is used to provide multiplexing capability so that the MUP controller can address its packet to either the primary or secondary control computer within an MDBS.

A major advantage of the aforementioned arrangement is that in its use of a CDPD mode for transmitting data, data can be transferred in a substantially uninterrupted manner even when the moving portable terminal/handset moves from one cell site area to another. Although some interruption may take place, normal redundancy protocols supply the data which otherwise would have been lost. Since the CDPD channels support digital data transfer, digital encryption techniques (as referred to in Appendix I) can be employed to maintain data security. Thus cellular communications can be rendered secure in a way not possible with a normal AMPS system.

Sleep mode procedures are used to place the handset in the sleep mode referred to, supra. The sleep mode is defined as an optional mode of operation that might be requested by an M-ES during the data link establishment procedure (communication between the mobile end station and mobile data intermediate system). The sleep mode is intended to assist power conservation strategies in the mobile end station. The general operation of the sleep mode permits an M-ES to disable or power-down its receiver and associated circuitry. This mode is a key aspect of CDPD mode operation.

The sleep mode procedure operates in the "multiple frame established state". In this operation, if there are no frames being exchanged on the data link connection between the M-ES and the MDBS after a period of time defined by the parameter T203, the data link connection may be placed in the Temporary Equipment Identifier (TEI) indicative of the sleep state for the handset. While in this state, the overall network will not attempt to transmit information destined for the M-ES. If after entering the sleep state, subsequent new frames become extant and waiting initial transmission, the network will broadcast a predetermined message at periodic intervals. This message contains a list of TEI's for which channel data is pending. The mobile end stations are expected to wake up at periodic intervals to determine if data for them is pending, and notify the network that they are willing to receive the pending data. Normally, the M-ES may exit the sleep state at any time.

It is noted that parameter T203 represents the maximum time allowed without frames being exchanged on the data link connection. On the user (M-ES) side, timing of the parameter T203 is started or restarted upon transmission of a data link layer frame (of any type) on the reverse channel (from the M-ES to the MDBS). On the network side, the timing of parameter T203 for a particular M-ES is started or restarted upon receipt of a data link layer frame (of any type) on the CDPD channel. If the value of parameter T203 expires, the data link entity will enter the TEI sleep state, and issue an indication of this state from the user's side. The layer management entity may take power conserving measures, such as disabling the radio receiver or other non-essential portions of its circuitry.

A second parameter, T204, represents the period at which the network side broadcast notification of pending data for a sleeping M-ES. A single timing operation for parameter T204 is maintained for a channel stream; all user side management entities discover and synchronize to particular channel streams T204, via the TEI notification procedure described in Section 6.88 of Volume IV of Appendix I. The number of frames queued in the maximum time for which the network attempts to notify an M-ES in the TEI sleep state are implementation dependent parameters. The network releases a data link connection and discards and queued frames for which the TEI sleep notification procedures are aborted. The maximum number of attempts to notify an M-ES in the TEI sleep state of pending network transmissions is designated system parameter N204. The network normally aborts a TEI sleep notification procedure for a TEI which has been included in a number of successive TEI notification messages (expressed as parameter N204) without a response from that M-ES.

A complete description of this operation is found in Section 6.8 of Volume 403 of the CDPD specification (Appendix I). Both the M-ES and the MDBS recognize when the last CDPD communication by a particular subscriber at an M-ES took place. In this respect, both the M-ES and the MDBS can be synchronized to each other. Using internal clocks, both units keep track of the time elapsed since the most recent CDPD communication between the M-ES and the MDBS. Thus, in operation according to this Section of the CDPD specification, if no data is sent in either direction over the air link for a certain length of time (parameter T203), the M-ES will go into the sleep mode and the network will assume that the M-ES is asleep. Once the M-ES enters the sleep mode another timing operation is carried out in both the M-ES and the MDBS. The length of this period is defined by the parameters T204 and N204, previously described. If the network has data to deliver to the M-ES that is believed to be asleep, the network will add the TEI for that M-ES to a list of sleeping units on a particular channel stream, that have data waiting for them. However, the network will not send that data.

This list is broadcast to all units on that channel stream periodically in a TEI notification message. The time between such notification is specified by the parameter T204. This parameter determines the length of time the M-ES is expected to sleep. When the M-ES awakens, it waits until it receives a notification message. If the TEI of that M-ES is on the list, it notifies the network that it is ready to receive data. If the TEI and the M-ES is not on that list, the M-ES goes back to sleep for another period of time specified by the parameter T204. If a consecutive number of notifications (specified by the parameter N204) have been made for a TEI without the subject M-ES indicating that it is ready to receive data, the network will then assume that the M-ES is no longer present and discards the data that was pending for that M-ES.

In order to utilize the advantages of the CDPD sleep mode, it is expedient to have a power supply which goes into a low output or dormant mode that shadows the operation of the CDPD sleep mode. While mobile radio telephone and portable radio power supplies having adjustable power outputs exist, it is noted that none are arranged to track the CDPD sleep mode.

As previously indicated, portable wireless stations are capable of a variety of different tasks carried out in a plurality of different modes of communication. For example, a wireless station can be a self-contained handset limited to the quarter watt power class. Or the wireless station could include a vehicle-mounted antenna and transceiver functioning so that a standard telephone style handset is the only piece of equipment in close contact with the wireless subscriber. As previously stated, the various types of voice and data communication including facsimile can be accommodated within a modern wireless mobile terminal. Multi-transceiver or variable frequency transceiver arrangements are also considered to be a part of modern wireless mobile terminals.

One example of a multiple frequency and multiple power level arrangement is found in Personal Communication Systems (PCS). One example of a PCS is found in U.S. Pat. No. 5,353,331, assigned to Bell Atlantic Network Services, Inc., and incorporated herein by reference.

The Personal Communication Service or "PCS" of the present invention uses an Advanced Intelligent Network (AIN) type architecture together with elements of a mobile communication system, such as a cellular radio-telephone network. One conceptual example of an AIN and cellular system for implementing the PCS service appears in simplified block diagram form in FIG. 2.

In the simplified example of FIG. 2, one or more central office switches, such as the class 4/5 Switch 111, are located throughout a state or region served by a TELCO providing the Personal Communication Service. Local telephone lines connect the central office switch 111 to individual telephone terminals in each geographic area, for example to the Plain Old Telephone Service (POTS) phone 113 and the base station 115 (described in detail below).

Although shown as telephones in FIGS. 3 and 4, the terminals can comprise any communication device compatible with the line. Where the line is a standard voice grade telephone line, for example, the terminals could include facsimile devices, modems etc. Similarly, the portable handsets can incorporate both standard telephone communication components and other communication devices. In fact, the portable units may not be handsets at all. If desired, the portable unit may comprise any communication device compatible with the system, for example portable facsimile devices, laptop computers, etc.

The preferred embodiments described herein provide the wireless communication services via radio links using frequencies assigned to cellular communications networks. Other types of wireless communication, however, could be substituted for the radio communication systems. For example, the invention could use a series of radio relay transponders, an infrared system or a satellite based system to provide one or more of the wireless links.

The Switch 111 connects via trunk circuits 121, 123 to one or more Mobility Controllers (MC's), such as the Cellular MC 117 and the PCS MC 119. As described in more detail with reference to FIG. 4, each central office will also connect via trunk circuits to one or more remote central offices. The trunk circuits carry large numbers of telephone calls between central offices and/or between a central office and the mobility controllers. Also, each central office has a Common Channel Inter-office Signalling (CCIS) type data link 125 going to a Signalling Transfer Point or "STP" 127. CCIS type data links 129 and 131 provide data communication for PCS and related special service processing between the MC's 117, 119 and the STP 127. Also, a CCIS packet switched data link 105 connects the STP 127 to an Integrated Services Control Point (ISCP) 100.

Each MC connects to antennas for a number of cell cites to provide wireless communication services to PCS portable handsets 135 and/or other wireless mobile communication devices. In the example shown, Cellular MC 117 controls communications via a number of macrocells 137. PCS MC 119 controls communications via a number of microcells 139. The MC's 117, 119 are also interconnected with each other by IS-41 data trunks 133, and may be interconnected via voice trunks (not separately shown) essentially running in parallel with the IS-41 trunks 133.

To provide land line type centrex services for a business customer, the switch 111 provides a land line connection 143 to the customer's premises 141. The land line link would actually include a number of telephone lines connected to various types of conventional telephone terminal devices. To provide wireless centrex services to a particular location, which may be the same customer premises 141, lines 145 connect the PCS MC 119 to macrocell antennae within the customer's building. Although shown as a single building, the integrated Centrex could cover a broader area, for example an entire college campus. The PCS system can integrate a customer's existing wireline-based Centrex or PBX services with a wireless version of those services. PCS will allow four digit dialing of the personal Centrex or PBX number, and it will recognize when the personal user is located within a unique wireless environment based upon registration information sent to it by the wireless Centrex/PBX provider for delivery of calls. Calls to the Centrex/PBX number will be automatically routed to wherever the personal user is, be it wired or wireless and on any connecting network.

FIG. 3 is a schematic block diagram of the components of AIN type integrated land line and wireless system, similar to the system of FIG. 2, but showing somewhat more detail of the preferred embodiment of the system for implementing the invention. In this figure, each of the CO switches are labeled as an "SSP." These Service Switching Points, referred to as SSP's, are appropriately equipped programmable switches present in the telephone network, which recognize AIN type calls, launch queries to the ISCP and receive commands and data from the ISCP to further process the AIN calls.

SSP's can be programmed to recognize a number of different triggers as an indication that a call is an AIN call. For example, the trigger can relate to the identification of the telephone line from which a call or other request for service originates, and such a trigger is useful for activating certain services to be discussed later. At least initially, however, for incoming PCS type calls the trigger is based on a recognition that the terminating station identified by the destination number is a PCS subscriber.

As shown in FIG. 3, all of the CO's 311, 313, 315, 317 and 319 are equipped and programmed to serve as SSP's. Such central office switching systems typically consist of the above discussed class 4/5 programmable digital switch with CCIS communications capabilities. One current example of such a switch is a 5ESS type switch manufactured by AT&T; but other vendors, such as Northern Telecom and Seimens, manufacture comparable digital switches which could serve as the SSP's. The illustrated embodiment is perhaps an ideal implementation which would make the Personal Communication Service widely available at the local office level throughout the network. As will be discussed later, other implementations provide the SSP functionality only at selected points in the network, and telephone end offices without such functionality forward calls to one of the SSP's.

A number of subscriber telephone lines connect to each of the SSP's which provide switched telephone communications services to subscriber terminals coupled to those telephone lines. Many of the TELCO's subscriber's will still have ordinary telephone terminals, as shown. Those who subscribe to PCS will have a home base unit, such as shown at 312, 314, 316 and 318. The base unit may be the only terminal device connected to a particular telephone line, as is base unit 312, or the base may connect to the line in parallel with one or more standard telephone station sets as does base unit 314.

To provide wireless mobile communications, the network further includes a number of Mobility Controllers or "MC's" which communicate with the SSP's, STP's and ISCP of the AIN type telephone network. As shown in the drawing, the network includes cellular MC's 322 and 326 and MC's 324 and 328 constructed specifically for PCS. Each of the MC's connects to an SSP type central office switch via a voice telephone trunk, shown in solid lines. MC's 322, 324, 326 and 328 each also connect to one of the STP's via an SS#7 link.

The system for implementing Personal Communication Service in one telephone company service area or perhaps one LATA includes a number of the SSP capable CO switches, such as the SSP's shown at 311, 313, 315, and 317. The SSP type central offices are each at a different location and distributed throughout the area or region served by the Personal Communication Service system. The PCS system of one regional TELCO will connect to networks serving other regions, for example the networks of other TELCO's. The switch 119 in FIG. 2 represents one of the SSP switches of a second TELCO implementing a PCS service.

The SSP's 311 and 313 connect to a first local area STP 323, and the SSP's 315 and 317 connect to a second local area STP 325. The connections to the STP's are for signalling purposes. As indicated by the black dots below STP's 323 and 325, each local area STP can connect to a large number of the SSP's. As shown by solid lines in FIG. 3, the central offices or SSP's are interconnected to each other by trunk circuits for carrying telephone services.

The local area STP's 323 and 325, and any number of other such local area STP's, shown as black dots between STP's 323 and 325, communicate with a state or regional STP 331. The state or regional STP 331 in turn provides communications with the TELCO's ISCP 340. The STP hierarchy can be expanded or contracted to as many levels as needed to serve any size area covered by the Personal Communication Service and to service any number of stations, central office switches, mobility controllers and mobile communication units.

The links between the SSP's and the local area STP's are CCIS links, typically SS#7 type interoffice data communication channels. The local area STP's are in turn connected to each other and to the regional STP 331 via an SS#7 packet switched network. The regional STP 331 also communicates with the ISCP's 340 via a packet switched network communications.

The network of the second TELCO can have an architecture essentially similar to that described above. For example, as shown in FIG. 3 the SSP 319 connects to a first local area STP 327 via an SS#7 link, and SSP 319 connects to one or more central offices or SSP's including SSP 317 by means of trunk circuits for carrying telephone services. The local area STP 327 communicates with a state or regional STP 333 of the second TELCO. The STP 333 provides CCIS type data communications with the second TELCO's ISCP 350 and with the SSP's and ISCP's of other TELCO's, for example by packet switched connection to STP 331. The link between the SSP 319 and the local area STP is a CCIS link, typically an SS#7 type interoffice data communication channel. The local area STP is connected to the regional STP 333 via a packet switched network also typically SS#7. The regional STP 333 also communicates with the ISCP 350 via a packet switched network. The second TELCO's network further includes a number of MC's such as MC 334, each of which will communicate with the SSP's, STP's and ISCP of the AIN type telephone network. Like the MC's of the first TELCO, MC 334 connects to an SSP 319 via a voice telephone trunk, shown as a solid line. MC 334 also connects to the local area STP 327 via an SS#7 link.

The above described data signalling network between the CO's and the ISCP is preferred, but other signalling networks could be used. For example, instead of the CCIS links, STP's and packet networks, a number of MC's together with several CO's and an ISCP could be linked for data communication by a token ring network. Also, the SSP capability may not always be available at the local office level, and several other implementations might be used to provide the requisite SSP capability. For example, none of the end office switches may have SSP functionality. Instead, each end office would connect to a trunk tandem which in turn feeds calls to a central SSP capable switch. The SSP then communicates with the ISCP, as in the implementation described above, but in this case via an SS#7 type CCIS link. In another embodiment, some of the end offices are SSP capable, and some are not. Again, each of the end offices normally communicates through a trunk tandem. For the SSP capable switches, they communicate directly with an STP which relays communications to and from the ISCP. For those end offices which lack SSP capability, calls are forwarded to the SSP capable trunk tandem which in turn relays data to and from the ISCP. In these alternate embodiments, the SSP capable trunk tandem switches are digital switches, such as the 5ESS switch from AT&T; and the non-SSP type end offices might be 1A analog type switches.

The MC's are connected with each other via IS-41 protocol trunks for exchange of data relating to handoff and to exchange of data for extending services to visiting subscribers of distant cellular systems who are not subscribers to PCS. The IS-41 data trunks are actually a packet switched network, which may be either an X.25 network or an SS#7 network. To provide handoff during a wireless call in progress, the MC's are also interconnected via trunk circuits (not shown).

To allow data communication of HLR data registered in the ISCP's 340, 350, to visitor location registers in remote MC's, the network further includes a hub STP 353. The hub STP connects to an X.25 packet switched data network, which currently carries IS-41 data messages between existing MC's outside the PCS service area. The hub STP 353 couples IS-41 messages between the X.25 network and the SS#7 network, shown by the dotted line data communication link to the regional STP 333. The communication through the hub STP 353 allows outside MC's to communicate with the ISCP's of both TELCO's providing the PCS type services as if the ISCP's 340, 350 were home location MC's for the PCS subscribers when PCS subscriber is visiting another service area.

The messages transmitted between the SSP's and the ISCP's are all formatted in accord with the Transaction Capabilities Applications Protocol (TCAP). The TCAP protocol provides standardized formats for various query and response messages. Each query and response includes data fields for a variety of different pieces of information relating to the current call. Of particular note here, an initial TCAP query from the SSP includes, among other data, a "Service Key" which is the calling party's address and digits representing the called party address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" responses for instructing the SSP to play an announcement or to play an announcement and collect digits.

As shown in FIG. 3, the ISCP 340 is an integrated system. Among other system components, the ISCP 340 includes a Service Management System (SMS) 341, a Data and Reporting System (DRS) 345 and the actual data base or Service Control Point (SCP) 343. The ISCP also typically includes a terminal subsystem referred to as a Service Creation Environment or SCE (not shown) for programming the data base in the SCP 343 for the services subscribed to by each individual business customer. Although not shown in detail, the ISCP 350 will typically have a similar integrated system structure. Alternatively, the second ISCP 350 may not be an "integrated" system. For example, the second unit 350 may include only a data base system similar to that of the Service Control Point (SCP) 343.

For standard telephone service, each central office switching system normally responds to a service request on a local communication line connected thereto to selectively connect the requesting line to another selected local communication line. The connection can be made locally through only the connected central office switching system. For example, for a call from station A to station B, the SSP 311 provides the call connection without any connection to another central office. When the called line connects to a distant station, for example when station A calls station C, the connection is made through the connected central office switching system SSP 311 and at least one other central office switching system SSP 313 through the telephone trunks interconnection the two CO's.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station if, however, the called station is not local, the call must be completed through one or more distant central offices, and further processing is necessary. If at this point the call were connected serially through the trunks and appropriate central offices between the caller and the called party using in channel signalling, the trunks would be engaged before a determination is made that the called line is available or busy. Particularly if the called line is busy, this would unnecessarily tie up limited trunk capacity. The CCIS system through the STP's was developed to alleviate this problem.

In the CCIS type call processing method the local central office suspends the call and sends a query message through one or more of the STP's. The query message goes to the central office to which the called station is connected, referred to as the "terminating" central office; for example, the query would go from originating SSP 311 to terminating SSP 313. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices of the network between the calling and called stations. The receiving central office then provides a ringing signal to the called station and sends ringback tone back through the connection to the calling station.

The call processing routines discussed above are similar to those used in existing networks to complete calls between stations connected to land lines. In an AIN system implementing Personal Communication Service, these normal call processing routines would still be executed for completion of calls originating from stations not subscribing to the Personal Communication Service.

In one implementation, the local SSP type CO's are programmed to recognize any call directed to any one of the PCS subscribers associated therewith as a Personal Communication Service Call. In response to such a call destination type trigger, the CO associated with the destination subscriber, i.e. the terminating SSP, would communicate with the ISCP via an STP to obtain all necessary call processing data to complete the PCS call to the subscriber's portable handset at its current location. It is also possible to program originating SSP's to determine whether or not outgoing calls are directed to PCS subscribers and trigger the communications with the ISCP at the originating SSP instead of the terminating SSP.

To extend special telephone services from the AIN to subscribers communicating via the mobile network will require adapting the MC's to trigger queries to the ISCP in response to outgoing call or service requests. One way to do this is to modify the switch structure and programming of the MC's so that each MC includes SSP functionality similar to that of the telephone network SSP's. Another approach is to modify the MC's to forward calls to an SSP capable switch or tandem, with outpulsing of the originating subscriber data, so as to process the calls via the tandem in manners similar to those used for non-SSP capable end offices switches discussed earlier.

Although described principally as "handsets", the mobile communication units used in the Personal Communication Service (PCS) can take many forms. The mobile communication unit could take the form of a vehicle mounted unit similar to existing mobile telephones. Also, the mobile communication units might include other communication devices compatible with the system, with or without incorporating standard telephone communication components. For example, the portable unit may comprise portable facsimile devices, laptop computers etc., one or more of which might incorporate a telephone handset.

The mobile communication unit, particularly when in the form of a handset, is configured in manner similar to the cordless handsets found in the prior art, except that the PCS units include a radio transceivers operating at cellular frequencies and capable of meeting cellular signalling protocols. The compatibility with cellular systems allows the PCS mobile units to roam through existing cellular networks. A microprocessor in the mobile unit controls all operations of the unit, particularly registration procedures and associated signalling transmissions.

The PCS handset has the capability of interfacing with a base station, usually at the user's home, a local cellular system in which the user's home is located, additional cellular systems having access to the AIN, local microcell systems and any wireless Centrex/PBX to which the handset has been previously granted access. In order for the handset to gain access to the local cellular MC and microcell type PCS MC, both must be set up to transmit the same system ID (SID) and to indicate combined paging and access channels.

In order for the handset of the PCS to access its own base station as well as the macrocell MC and the microcell MC, the handset must operate at cellular frequencies. The scanning function of the handset is prioritized so as to register with its personal base station first. If the base station is not contacted the handset scans the macrocell and microcell control channels, selecting to register with the MC of the microcell system if detected before attempting to register with the MC of the macrocell system. If the handset has been granted access to a wireless Centrex system, it scans a set of control channels specially programmed into the handsets of Centrex members only. Selection of one of these special channels must be done by the specific action of the handset user, and additional handshake procedures may be carried out requiring a PIN number from the user before he is permitted to interface with the wireless Centrex.

The PCS home base station is structurally similar to prior art cordless telephone base stations, except that the transceiver in the base station operates at cellular frequencies and uses signalling protocols similar to those of the cellular network to perform registration procedures. Of particular note here, the base station includes a microprocessor for programmed control of base station operations. To perform registration with the ISCP, the base station also includes an auto dialer, and may include means to detect call progress tones and/or certain instruction signals from the telephone network.

The aforementioned PCS system is indicative of the type of multi-power level of duty cycle required of power supplies servicing modern wireless handsets. Adjustable power supplies for servicing portable and mobile radio telephone units are well known in the conventional art. A number of examples are listed as follows.

U.S. Pat. No. 4,679,244 to Kawasaki et al. is directed to a method of transmitting terminating call signals within a restricted duration. This system also includes a base station in a portable unit arranged for particular use with the subject method. The system is arranged so that a portable unit may be called from a base station through a radio control channel by a succession of terminating call signals. The terminating call signals are sent through the control channel from the base station, to portable unit for a first or restricted time duration ($T_1$). This time duration is selected in consideration of a battery saving period calculated to save battery power within the portable unit. During the battery saving period, the portable unit is put into transient active and inactive states during a first time interval and a second time interval, respectively. The first time interval is longer than the second time interval so that the portable unit receives at least one of the terminating call signals during the first time interval. The base station monitors an acknowledgement signal for a second time duration ($T_2$) after the lapse of the first time duration ($T_1$), and interrupts the control channel when the acknowledgment signal is not received within the first and second time durations ($T_1$, $T_2$). In the portable unit, the battery saving operation is halted when the presence of the terminating call signal is detected by a squelch circuit. The effect of this operation is that the portable unit is periodically put into a transient active state and a transient inactive state by the battery saver circuit.

U.S. Pat. No. 5,109,530 to Stengel is directed to a radio receiver with a battery saving system. The receiver goes into a "sleep mode" in response to a monitored signal. The receiver is used for recovering modulation signals and includes a detector and a decoder for detecting the presence of a non-valid coded squelch signal and decoding such a signal in the recovered modulation signal. The receiver further includes a synchronizer for synchronizing the detected non-valid coded signal. The receiver is placed in a battery saving mode when a non-valid coded squelch signal is detected. The battery saver mode includes monitoring the recovered modulation signal for a change in the non-valid coded squelch signal. At which point, the battery saver mode ends.

U.S. Pat. No. 5,241,568 to Fernandez et al. is directed to a method and apparatus for synchronizing a receiver to transmit a signal while conserving power in that receiver. The method operates so that a receiver receives a transmitted signal having a first predetermined signal for indicating a start of a new transmission to the receiver. The transmitted signal has a second predetermined signal inserted at periodic sampling time intervals for synchronizing receiver to the transmitted signal. The receiver synchronizes to the transmitted signal by detecting the first predetermined signal followed by the second predetermined signal and establishing subsequent periodic sampling time intervals therefrom. The receiver manages to conserve power during a second portion of the periodic sampling time interval following the detection of a first portion of the second predetermined signal during a first portion of the periodic sampling time interval. If the receiver does not detect the first portion of the second predetermined signal, then the receiver searches for a portion of the first predetermined signal during the second portion of the periodic sampling time interval to determine a possible start of a new transmission. Power conservation can also be achieved by inhibiting the receiving circuitry, the decoding means and disabling other non-essential circuits and functions in the receiver during a "sleep cycle". Essentially, the receiver is shut down during certain preassigned frames.

U.S. Pat. No. 5,382,949 to Mock et al. is directed to a method for increasing battery life for selective call receivers. The selective call receiving system includes a base sight which transmits paging information having a plurality of batches. The base sight comprises a timer for calculating a time between a first of the least two successive paging transmissions and a counter for counting a number of batches to be transmitted in the subject paging transmissions. A base sight processor coupled to the timer counter processes the paging information. The base sight processor comprises an encoder for encoding a portion of the first of the successive paging transmissions with the calculated time and the number of batches to be transmitted in the first page in transmission. A base sight transmitter coupled to the base sight processor transmits the successive paging transmissions according to the calculated time to a plurality of selective call receivers. A selective call receiver comprises a receiver for receiving the paging transmissions, and a decoder coupled to the receiver for decoding the number of batches being transmitted therein, as well as a time to a next paging transmission. A power switch is coupled to the decoder for disabling and enabling a power supply to the receiver in order to receive an assigned frame of the plurality of transmission batches. The power switch is responsive to the plurality of batches being decoded so as to disable or enable the power supply to the receiver in order to receive successive paging transmissions.

U.S. Pat. No. 5,196,728 to Jaux is directed to a method of controlling a network of electronic stations. The method encompasses the use of a sleep mode when no active function of the network is indicated. In effect, the system is put into an active mode or a sleep mode based upon various electric loads placed upon the electrical system in a motor vehicle. The method operates to generate an activation signal in at least some of the stations in the network when a previously inactive function is requested. The system also generates a deactivation signal when an associated previously active function is to be deactivated. The system further operates to detect the generated activation and deactivation signals incrementing at least one counter by one step each time when the associated activation signal is detected. Likewise, the system operates to decrement the same counter by one step each time an associated deactivation signal is detected. A sleep signal is finally generated when a counter reaches a zero count after being decremented.

U.S. Pat. No. 5,140,698 to Toko is directed to a mobile telephone system with intermittent control of receiver components in a standby state. The mobile telephone system operates to send an intermittent signal to a power switch during a standby state so that power is turned on during the period when a necessary signal portion of a control signal derived from a signal receiving portion is input. The power switch is turned off during a period when an unnecessary signal portion of the control signal is input. Thus, the components of the signal receiving portion have short rise times and thus, short time intervals between the activation of the power source and the start of the operation. The use of intermittent power supplied to the system reduces power consumption.

U.S. Pat. No. 5,255,179 to Zekan et al. is directed to a switched mode power supply for a single-phased boost in the range of 1 kw to 10 kw AC. The power supply includes a DC-AC power converter which is connectable to a DC source and includes a first and second pair of switches which convert the DC source directly to AC. This is done by alternately switching between each of the first pair of switches at high frequency modulation and between the second pair of switches alternately switching at each of the half cycles of the low frequency fundamental output voltage. The result is a positive pulse train and a negative pulse train. A transformer boost is a source voltage to the desired high voltage of the output of the converter circuit. A filter is connectable to an AC load and has a plurality of damping modes for extracting fundamental frequency from the output of the transformer. The filter is operated responsive to a signal for switching between damping modes. A sine wave oscillator generates a sine wave at the fundamental frequency. Feedback circuits maintain the AC output at the fundamental frequency. Thus, the system is capable of generating a regulated DC output or a 60 Hz high voltage AC output.

U.S. Pat. 4,074,145 to Laffoon et al. is directed to an electric power generating apparatus incorporating an automobile alternator operatable in a high voltage mode suitable for providing power for hand tools. The generator also operates in a low voltage mode suitable for maintaining the charge of a battery which provides a field current for the alternator. A switching circuit manually or automatically actuable to place the generator in the high voltage mode of operation interposes a voltage regulator in the field current circuit and connects the output of the alternator to the battery to charge the battery when the generator is operated in the low voltage mode. The switching circuit also interposes a variable resistor in the field current circuit and disconnects the battery from the output of the alternator to permit adjustment of the output voltage of the alternator when the generator is operated in the high voltage mode.

U.S. Pat. No. 5,175,439 to Harer et al. is directed to a power supply circuit for a motor vehicle. The power supply includes a 24 volt battery, a bi-directional converter, a combination of a starter/generator, and a rectifier/inverter. After start-up, the output of the generator is rectified by the diodes of the rectifier/inverter to provide 300 volts DC. A DC/AC inverter converts the 300 volt DC to 220 volts, 60 Hz AC. The bi-directional converter steps-down the 300 volt DC to 240 volt DC in order to provide power for other DC applications. An additional AC/DC rectifier supplies 5 volts DC–12 volts DC. The system also has the capability of providing 220 volts AC at 50 Hz.

U.S. Pat. No. 3,655,991 to Schneider is directed to a power output unit and a method for operating that unit to deliver constant frequency, constant voltage AC power. The power output unit is used as an accessory with an engine-powered vehicle having a conventional electrical system including a battery, voltage regulator and a dynamo which during normal operation supplies DC power to the vehicle electrical system. The system includes switches adapted to isolate the dynamo from the vehicle electrical system, and means for boosting the DC voltage output from the dynamo, as well as converting it to a constant frequency AC voltage. An outlet receptacle is provided to accept jacks from power tools or appliances having constant frequency AC voltage power requirements. The outlet receptacle voltage is monitored and the dynamo field current is adjusted in response to variations therein to control the dynamo voltage and the current input to the accessory unit.

U.S. Pat. No. 3,824,404 to Ghere is directed to a power output device for conversion of a vehicle alternator electrical system to supply electrical power for the operation of lighting fixtures, hand tools, etc. The power output means is connected to the normal vehicle ignition and includes a master switch connected to a voltage control assembly and current control assembly to achieve a power output at an output receptacle. The power output receptacle is regulated regardless of the vehicle engine speed.

While the aforementioned examples of conventional vehicle power supplies provide a variety of different operating cycles, nothing in the conventional art accommodates a composite mobile data terminal for efficient power supply output responsive to both a CDPD sleep cycle and the capacity to provide 120 volt AC power to communications equipment.

Because of the multi-transceiver, multi-duty wireless stations made economical by the existing technology, wireless terminals may easily encompass such duties as short wave citizen band operation, high power amateur radio operation, satellite communication, cellular telephone voice and data transmission, as well as cordless telephone operation, is also feasible. Such multi-facetted wireless stations may be arranged in vehicles, or even large brief cases. To achieve such capability, of necessity, the power supply energizing the wireless terminal must have the facility to allow operation in a variety of modes and power classes.

DISCLOSURE OF THE INVENTION

An object of the present invention is to provide a power supply capable of supporting operation of a mobile radio telephone terminal integrating AMPS, CDPD, PCS and high power short wave operation.

Another object of the present invention is to promote efficient usage of a power supply supporting CDPD operation by taking advantage of the low power CDPD dormant or "sleep" state.

A further object of the present invention is to develop a priority based upon mobile station communication use and to optimize power supply expenditure based upon that prioritization.

Yet another object of the present invention is to coordinate the use of the high voltage and low voltage outputs of the power supply to maximize power supply efficiency.

These and other objects of the present invention are carried out by a mobile radio telephone data terminal comprising an RF transceiver portion, means for controlling analog cellular Advanced Mobile Phone Service (AMPS) or PCS communication and means for controlling Cellular Digital Packet Data (CDPD) communication. Power is provided by a variable level power supply arranged to provide a plurality of low voltage outputs and at least one high voltage output. The invention further includes means for controlling the power supply output responsive to the CDPD operating cycle as well as the incidence of AMPS or PCS communication. The invention also includes means for de-activating the high voltage output of the power supply in response to the CDPD operating cycle and any incidence of AMPS communication being conducted by the mobile data terminal.

BEST MODE FOR CARRYING OUT THE INVENTION

Figure 4:
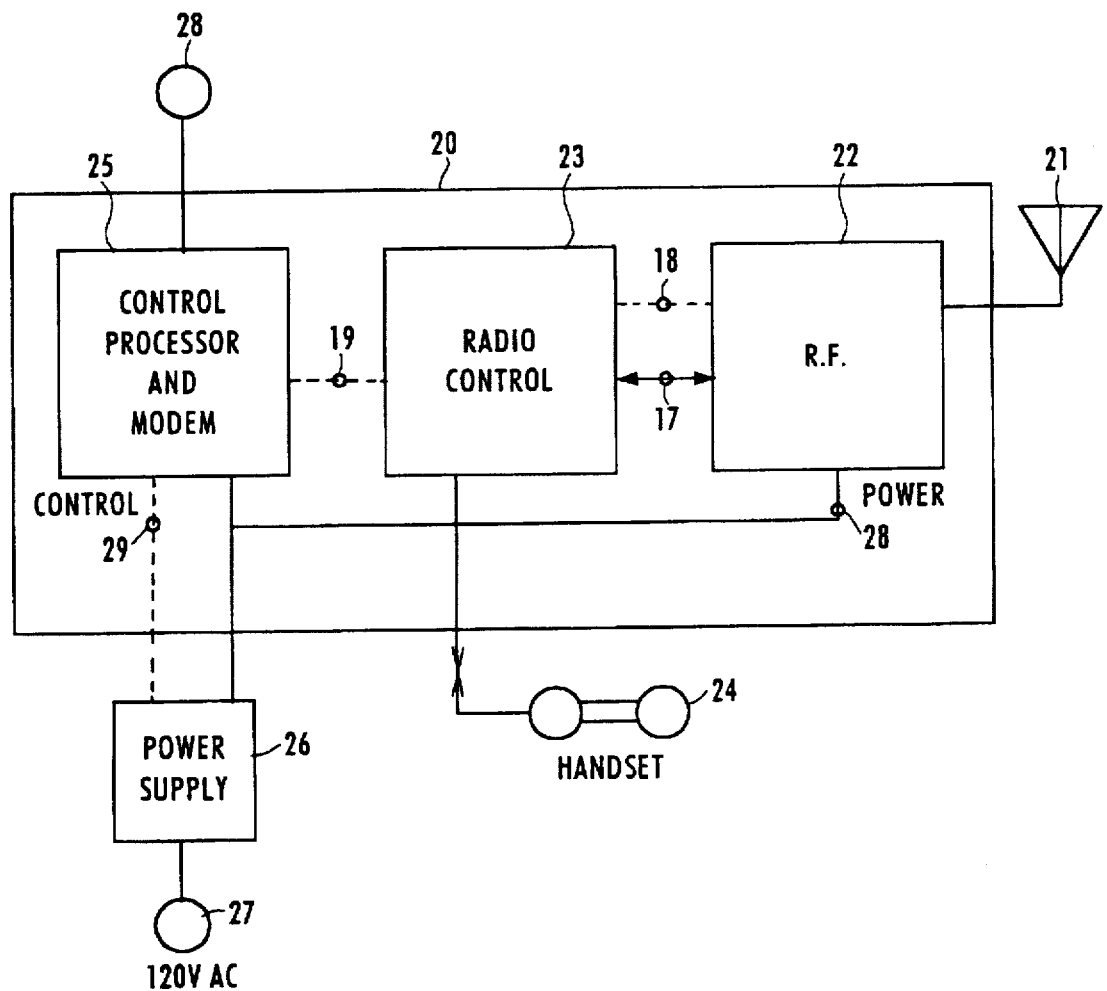
FIG. 4 is a block diagram depicting a portable wireless telephone handset used to carry out the present invention.

Integration of cellular voice communication and data communication is facilitated by the device of FIG. 4. This device includes a power supply responsive to the cycles of CDPD communication and AMPS voice communication. The power supply also accommodates high voltage (120 volts AC) output for high power radio devices such as satellite communication systems and short wave amateur radio communications. Handset 20 depicted in FIG. 4 is similar to a conventional portable radio telephone handset in that it includes a radio frequency module 22 having at least one radio frequency transceiver. However, the radio frequency module could include a plurality of transceivers operating at different power levels and different frequencies as described earlier with respect to Personal Communication Systems (PCS). The radio frequency transceiver uses a main antenna 21 for both receiving and transmitting the various types of signals handled by the handset, such as PCS, AMPS communication, circuit switched cellular data communication, and CDPD communication. If a plurality of transceivers are used, a plurality of antennas can also be provided. Another alternative is a diversity antenna (not shown), used as a backup to the main antenna 21 for reception purposes under certain adverse conditions.

Radio control processor 23 carries out the functions performed in any cellular handset. These include control of the registration sequence and handoff sequence in accordance with the overall cellular system constraints. Other functions include interfacing with a standard telephone handset 24 available to the handset user for transmission and receipt of voice communication. Radio control processor 23 sends voice and data communication via link 17 to the RF module 22, as well as control data over control data link 18. Only voice communication is conducted between handset 24 and radio control processor 23. In addition, radio control processor 23 is connected via data link 19 to the control processor and modem 25.

Processor 25 is dedicated to the control of data communication, in particular, CDPD communication. The requirements for the programming of control processor 25 are set forth in Appendix I attached to this application. As previously stated, CDPD control applies for the overall radio control a mobile end user station 20, subject to default when AMPS communication is required. It is noted that AMPS communication is subject to default in accordance with the duty cycle of PCS communications described, supra. Consequently, the CDPD system will interpret PCS usage as being equivalent to AMPS usage. Control of the PCS operation can be relegated either to radio control processor 23 or control processor/modem 25. Programming such processors to carry out AMPS and PCS functions is a technique well known to practitioners in the radio telephone art.

Since CDPD communication, as well as personal communication systems are subject to the constraints of cellular communication systems in accordance with the IS-54 standard, power requirements for the output of the mobile end user station are predetermined. When the handset 24 and the overall transceiver are combined for close contact with the user, no more than 0.25 watts of power can be transmitted. In the alternative, 0.6 watts are permitted when handset 24 is not integrated with the RF Section 22, including antenna 21.

Thus, the requirements of power supply 26 are well known for standard cellular operation. However, the use of CDPD communication creates a whole new set of requirements for power supply 26 if it is to be responsive to the demands of the mobile end station 20 while still maintaining the efficient use of power. Thus, control processor 25 carries out the additional operation of controlling power supply 26 via control data link 29. This additional control is required to conform the power supply operation to the CDPD operating cycle, as well as integrate the use of high power output (120 volts AC) 27 with the low power operation required by mobile end station 20.

The high voltage output 27 is necessary to provide capacity for the aforementioned high power applications, such as short wave communications, considered desirable in the comprehensive mobile communication system. Such systems would operate in addition to the cellular voice/data system represented by end user station 20. For most efficient operation of power supply 26, the operation of the high voltage output 27 must be integrated with the operation of the low power equipment represented by 20. Such operation is better appreciated when examined in view of a more detailed consideration of CDPD operation.

Figure 1:
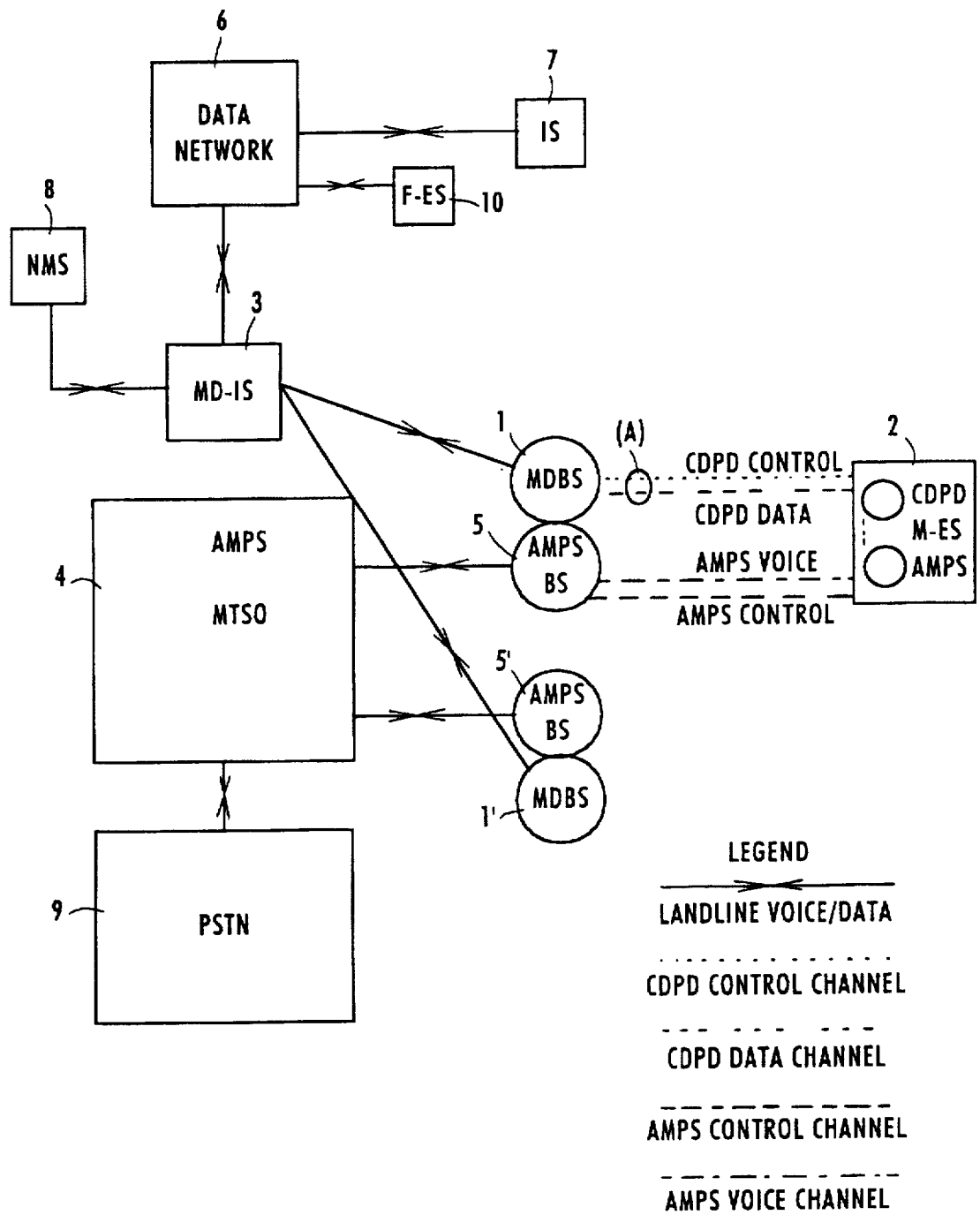
FIG. 1 is a block diagram depicting the relationship between an AMPS and CDPD communication arrangements.
Figure 2:
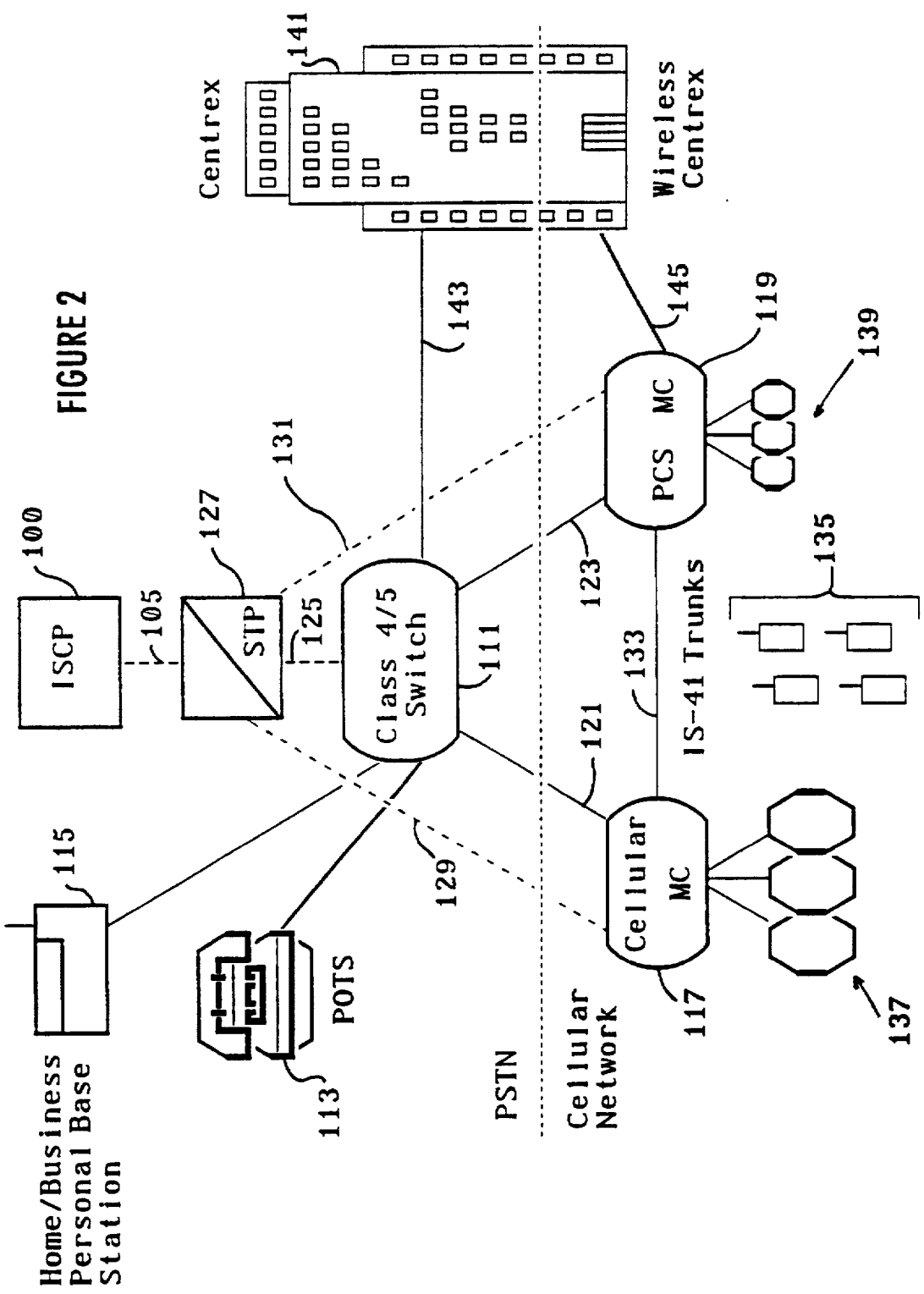
FIG. 2 is a block diagram depicting a personal communication system.
Figure 3:
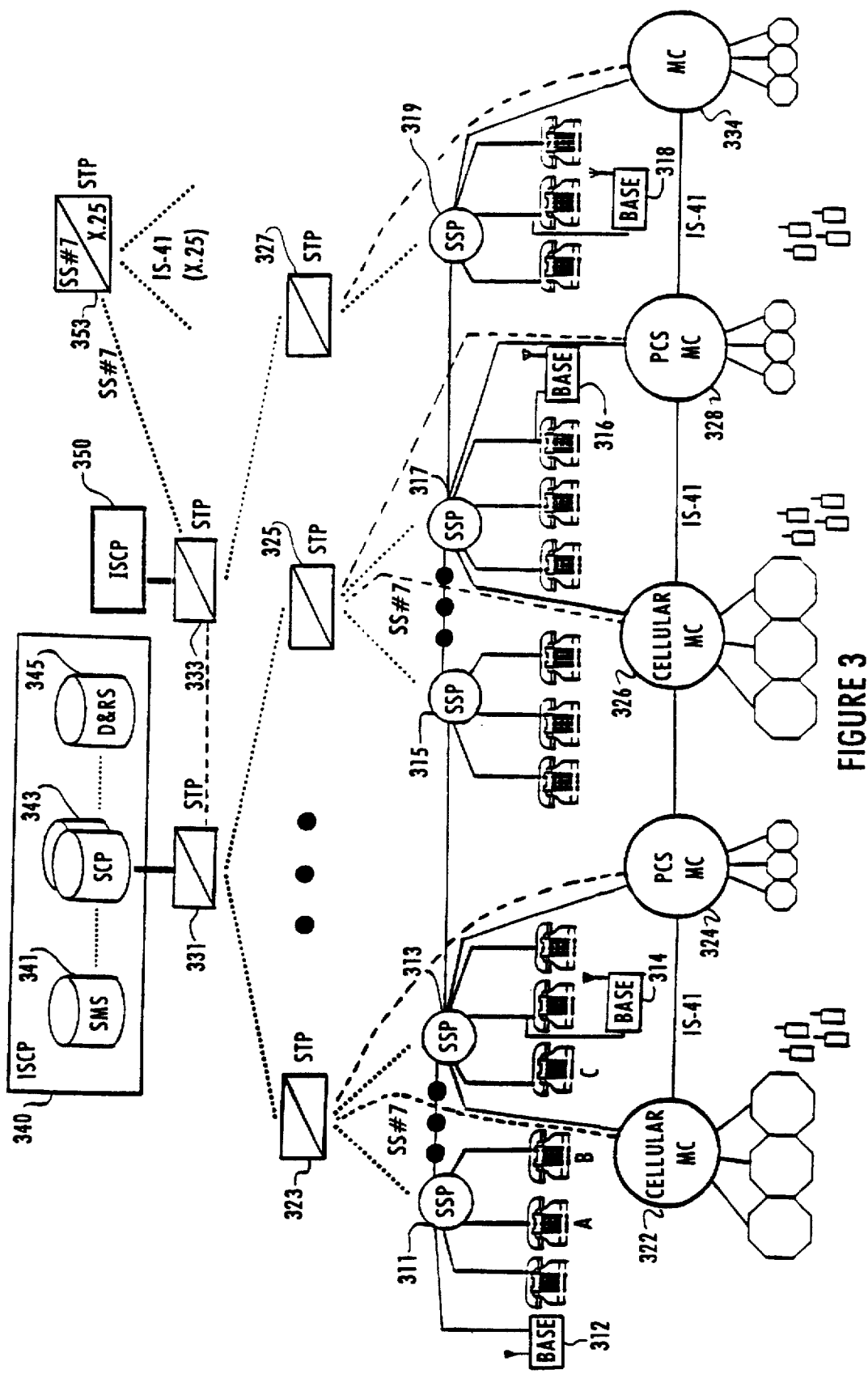
FIG. 3 is a block diagram depicting an advanced intelligent network.

In the CDPD mode, a cellular handset such as end user station 20 operates as a fully functional CDPD mobile terminal. In order to participate in the CDPD network, the station communicates with a mobile data base station as depicted in FIG. 1 using GMSK modulation on AMPS radio frequencies and occupying an AMPS channel. According to this operation, the end user station will monitor received signal strength. Based upon the detected values of the received signal strength, the user station will locate the strongest CDPD channel and register on that channel in a local CDPD cell associated with a CDPD mobile data base station as depicted in FIG. 1. The end user station will also locate and switch to a new CDPD channel whenever the local mobile data base station switches channels. The CDPD system supports hand-off to an adjacent cell if the mobile end user station changes location so as to cause received signal level changes.

By operating in the CDPD mode as described above, the subject end user station has the capability of sending data messages such as electronic mail input by a handset keypad (not shown) to others within the CDPD network. The end user station can also be used to transport data (via electronic mail/paging/fax) to and from a host computer associated with the end user station via an appropriate I/O port (connecting the end user station to the computer) and the CDPD network. Since the hand-off sequence in the CDPD mode mitigates against data loss, as indicated in Appendix I, successful data transfer can take place even when the mobile end user station is moving from one cell site to another. While in the CDPD mode, the mobile end user station is able to conserve battery power by remaining in a dormant or "sleep" protocol when data is not being sent or received. The characteristics of the sleep mode have been previously described in this application and are part of the CDPD specification included in Appendix I of this application.

Because of the higher priority assigned to cellular communications due to cost and reliability, other forms of communication will, of necessity, be subrogated to both AMPS and CDPD communications as well as PCS operation under normal circumstances. This operation reduces the burden on the battery should the vehicle containing the end-user station not be operating at the time of communication. Thus, high powered communication (such as citizen band, satellite or short wave radio amateur) are assigned a subsidiary role in the operation of the mobile end user station.

Figure 5:
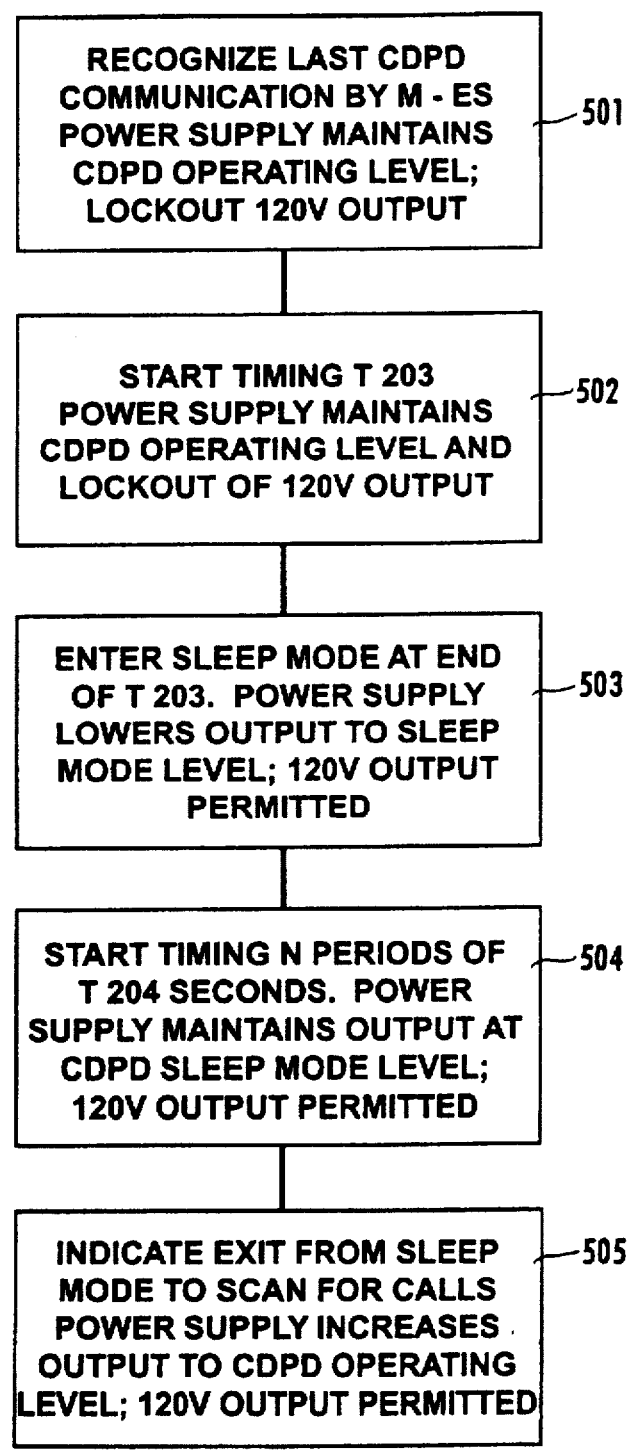
FIG. 5 is a flow diagram depicting the relationship between the operation of the power supply and the CDPD communication system.

The operation of the present invention relating to the operation of power supply 26 and the CDPD operation cycle is depicted by the flow chart of FIG. 5. At step 501, mobile end user station is in the CDPD mode and in active CDPD communication. Thus, mobile end user station is operating at the maximum power for CDPD permitted by the configuration of the handset in accordance with the IS-54 standard. At this time, power supply 26 maintains the CDPD operating level, as well as maintaining the lock-out of the 120 volts output of power supply 26. Thus, the power supply operates efficiently by avoiding the generation of the 120 volts AC output at a time when it is not needed. The same lock-out would also apply for AMPS communication. At step 501, the last CDPD communication by the mobile end user station is recognized.

At step 502, a timer starts upon the recognition at step 501. The timer operates for a period described by the parameter T203, explained supra in this application. During this timing phase, the power supply 26 maintains the CDPD operating level and continues to maintain lock-out of the 120 volts output. It is noted that in the event of AMPS, or PCS operation, the power supply would react to go into a higher power output level to accommodate such communication. It is also noted that the PCS operation (as previously described in this application) the cordless mode of operation will require less power than the cellular mode of operation. Consequently, the power supply of the present invention will automatically alter its power output level in accordance with control signals from control processor/modem 25 to accommodate these changes in operating mode while maintaining the most efficient output level.

At step 503, the mobile end user station enters the sleep mode at the end of the period designated by the parameter T203. At this point, the power supply lowers its output to the sleep mode level, however, the 120 volts AC output from output 27 is permitted since CDPD communication appears to be ended. The lock-out, however, would be reinstated upon the detection of AMPS communication directed to the mobile end user station. As previously described, a number of timing sequences designated as N are begun. Each sequence is designated by the parameter T204 to determine the exact time duration. During these timing periods, 120 volts AC output at terminal/bus 27 is permitted since CDPD communication is not being carried out. Thus, automatic scanning of high power short wave frequencies becomes possible with the energized 120 volt output at terminal/bus 27. Normally, the total time spent during the sleep mode will be approximately four to five minutes. After which, the end user station automatically goes into a scanning mode to detect for incoming CDPD paging signals or an indication that CDPD messages are being held in the network for transmission to the end user station.

At step 505 at the end of time periods, each of T204 seconds, a mobile end user station exits from the sleep mode to scan for incoming calls or pending messages on the CDPD system. At this point, the power supply increases its output to the CDPD operating level. However, 120 volts AC output is still permitted. Only if there is a downloaded CDPD message, or CDPD communication to be originated from the mobile end user station, is the lock-out of the 120 volts AC terminal is re-instated. Since indication of CDPD communication to the user of the terminal is imperative during CDPD communication, the lock-out of the 120 volts output permitting different forms of communication is important in maintaining the communications priority of the entire mobile end user station. Thus, priority of AMPS, PCS and CDPD communications is always maintained over that of other forms of communication from the vehicle.

The conventional art discloses power supply circuits that are controllable to change output based upon an input of control signals. Such control signals can be programmed into a microprocessor such as those used to carry out the function of control processor and modem 25. In the present invention, the control signals are generated responsive to the recognition of a CDPD communication and a series of timing circuits (contained in control processor 25) in order to track the operation of the CDPD active and sleep modes. The programming and control of the power supply is also arranged to accommodate the power output necessary for alternative forms of communication within the vehicle containing the mobile end user station.

However, the user of the vehicle may wish to assign other priorities. Thus, simple override control 28 (in FIG. 4) can be used to override the lock-out and permit communication requiring the 120 volts AC output regardless of AMPS or CDPD activity. Further, the keypad handset (not shown) can be used to program instructions in control processor 25 in order to provide any arrangement of priorities found to be desirable for the power supply 26. Thus, any power supply cycle desired can be programmed by the user of the terminal.

Although a number of arrangements of the present invention had been mentioned by way of example, it is not intended that the invention be limited thereto. For example, the present invention can be adapted so that the end user station 20 is connected to a host PC and power supply 26 is programmed thereby. Further, a keypad on the handset 24 can be arranged so that control signals can be provided to radio control module 23 and thus to control processor 25, thereby programming the duty cycle of power supply 26. Accordingly, this invention should be considered to include any and all configurations, modifications, variations, combinations, combinations or equivalent arrangements falling within the scope of the following claims.

APPENDIX I

Cellular Digital Packet Data System Specification, Vols. 1–7, Jul. 19, 1993.

APPENDIX II

1) Cellular Digital Packet Data System Specification. Version 1.0, August 1993.

2) [IS-19-B] Recommended Minimum Standards for 800-MHz Cellular Subscriber Units, Electronic Industries Association. Document EIA/IS-19-B, May 1988.

3) [EIA/TIA-553] Mobile Station—Land Station Compatibility Specification. Electronic Industries Association Document EIA/TIA-553, September, 1989.

4) [EIA/TIA-496-A] Interface between Data Circuit-Terminating Equipment (DCE) and the Public Switched Telephone Network (PSTN), Document EIA/TIA 496-A, November, 1989.

5) [FCC-15] Part 15 of the Code of Federal Regulations, Title 47 (47 CFR), Radio Frequency Devices, October, 1991.

6) [FCC-22] Part 22 of the Code of Federal Regulations, Title 47 (47 CFR), Public Mobile, October, 1991.

7) [FCC-68] Part 68 of the Code of Federal Regulations, Title 47 (47 CFR), Connection of Terminal Equipment to the Telephone Network, October, 1991.

8) [RSS-118-003] Land and Subscriber Stations: Voice, Data and Tone Modulated, Angle Modulation Radiotelephone Transmitters and Receivers Operating in the Cellular Mobile Bands 824–849 MHz and 869–894 MHz., Document RSS-188, Issue 2, May, 1990.

9) [UL-1950] Standard for Safety of Information Technology Equipment Including Electrical Business Equipment, March, 1989.

10) [UL-1459] Standard for Safety of Information Technology Equipment Including Electrical Business Equipment, December, 1987.

11) [CAN/CSA-C22.2] No. 225 and No. 950 (Safety of information Technology Equipment, Including Electrical Business Equipment).

12) [DOC CS-03] Standard for Terminal Equipment, Terminal Systems, Network Protection Devices, Connection Arrangements and Hearing Aids Compatibility, February, 1990.

13) [EIA/IS-19-B] Recommended Minimum Standards for 800-MHz Cellular Subscriber Units, May, 1988.

14) [TIA/EIA-592] Asynchronous Facsimile DCE Control Standard, May, 1993.

15) [EIA/TIA-578] Asynchronous Facsimile DCE, Asynchronous Facsimile DCE, November, 1990.

16) [EIA/TIA-470-A] Telephone Instruments with Loop Signalling, July, 1987.

17) [CCITT Volume VII—Fascicle VII.3] Terminal Equipment and Protocols for Telematic Services Recommendations T.0-T.63, Blue Book.

18) [CCITT Volume VIII—Fascicle VIII.1] Data Communication over the Telephone Network Series V Recommendations, Blue Book.

19) [CCITT V.17] Data Communications over the Telephone Network a 2-Wire Modem for Facsimile Applications with Rates up to 14,400 Bit/s—Recommendation V.17, 1991.

20) [CCITT V.32bis] Data Communication over the Telephone Network—a Duplex Modem Operating at Data Signalling Rates of p to 14,400 Bit/s for Use on the General Switched Telephone Network and on Leased Point-to-Point 2-Wire Telephone-Type Circuits—Recommendation V.32bis, 1991.

21) [CCITT V.42bis] Data Communication over the Telephone Network—Data Compression Procedures for Data Circuit Terminating Equipment (DCE) using Error Correction Procedures—Recommendation V.42bis, 1990.

22) [CCITT V.42bis] Data Communication over the Telephone Network—Data Compression Procedures for Data Circuit Terminating Equipment (DCE) using Error Correction Procedures—Recommendation V.42bis, 1990.

23) Product 1 Control Software High Level Design, Pacific Communication Sciences, Inc., Apr. 29, 1993.
24) ITU CCITT Series V Recommendations, V.21, V.22, V.22bis, V.27ter, V.29, V.32, V.42, V.42bis.
25) ITU CCITT Series T Recommendations, T.30, T.35.
26) IEC801.
27) Bell 212A.
28) EIA/TIA-562.
29) EIA/TIA-605, Facsimile Systems and Equipment—DCE-DTE Packet Protocol Standard, December, 1992.
30) MNP 5 Microcom Networking Protocol Update Letter Number 6, Mar. 30, 1987.
31) MNP 10 Microcom Networking Protocol Class 10 Specification 1.0, Oct. 21, 1991.
32) EIA PN2230 Multimode Handshaking.

We claim:

1. A mobile radio telephone data terminal comprising:
   (a) an RF transceiver portion including a plurality of transceivers:
   (b) means for controlling analog cellular Advanced Mobile Phone Service (AMPS) communication:
   (c) means for controlling Cellular Digital Packet Data (CDPD) communication;
   (d) a variable level power supply arranged to provide a plurality of low voltage outputs and at least one high voltage 120 volt AC output, wherein said high voltage AC output is for use by an external load;
   (e) means for controlling the variable level power supply output responsive to a CDPD operating cycle and incidence of AMPS or PCS communication;
   (f) means for de-activating said high voltage AC output of said power supply responsive to said CDPD operating cycle and said incidence of AMPS or PCS communication, wherein said power supply output is adjusted responsive to various levels of PCS operation.

2. The mobile radio telephone data terminal of claim 1, further comprising means for manually overriding said means for de-activating said high voltage AC output.

3. The mobile radio telephone data terminal of claim 2, wherein said high voltage AC output is normally de-activated during AMPS communication.

4. The mobile radio telephone data terminal of claim 3, wherein said high voltage AC output is normally de-activated during an active portion of said CDPD cycle.

5. The mobile radio telephone data terminal of claim 4, wherein said high voltage AC output is normally activated during a sleep portion of said CDPD cycle.

6. The mobile radio telephone data terminal of claim 5, wherein said high voltage output AC is normally de-activated during PCS communication.

7. The mobile radio telephone data terminal of claim 6, wherein said RF transceiver portion comprises an antenna located in the common portable housing containing elements (a), (b), (c), (e) and (f).

8. The mobile radio telephone data terminal of claim 7, wherein said variable level power supply is contained in said common portable housing.

9. The mobile radio telephone data terminal of claim 8, further comprising a telephone handset coupled to said means for controlling AMPS communication.

10. The mobile radio telephone data terminal of claim 9, further comprising means for programming operation of said variable level power supply.

11. A mobile radio telephone data terminal comprising:
    (a) an RF transceiver portion including a plurality of transceivers;
    (b) means for controlling analog cellular Advanced Mobile Phone Service (AMPS) communication;
    (c) means for controlling Cellular Digital Packet Data (CDPD) communication;
    (d) a variable level power supply arranged to provide a plurality of low voltage outputs and at least one high voltage output, wherein said high voltage AC output is for use by an external load;
    (e) means for controlling the variable level power supply output responsive to a CDPD operating cycle and incidence of AMPS or PCS communication; and
    (f) means for de-activating said high voltage AC output of said power supply responsive to said CDPD operating cycle and said incidence of AMPS or PCS communication.

12. The mobile radio telephone data terminal of claim 11, wherein said transceiver portion includes a plurality of transceivers each operating at a different power level and at a different frequencies frequency than another of said plurality of transceivers and said power supply controlled to provide the required power level for each transceiver.

13. The mobile radio telephone data terminal of claim 11, wherein said high voltage AC output is normally activated during a sleep portion of a CDPD cycle.

* * * * *